US008666538B2

(12) United States Patent
Deas et al.

(10) Patent No.: US 8,666,538 B2
(45) Date of Patent: Mar. 4, 2014

(54) INFORMATION FILLING STATION FACILITATING WIRELESS TRANSFER OF DATA CONTENT TO A PORTABLE DEVICE OR OTHER PRE-DEFINED LOCATIONS

(75) Inventors: David A. Deas, Round Rock, TX (US); Lalitha Suryanarayana, Austin, TX (US); Bruce Edward Stuckman, Austin, TX (US); David Randall Wolter, Austin, TX (US); Rias Muhamed, Austin, TX (US); Russell William White, Austin, TX (US); Michael Grannan, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2603 days.

(21) Appl. No.: 10/180,521

(22) Filed: Jun. 27, 2002

(65) Prior Publication Data

US 2004/0002359 A1    Jan. 1, 2004

(51) Int. Cl.
*G06F 17/00*      (2006.01)
*G06Q 30/00*     (2012.01)

(52) U.S. Cl.
USPC .......... 700/234; 700/231; 700/232; 705/14.4; 705/14.58; 705/14.64; 705/26.1; 705/27.1

(58) Field of Classification Search
USPC ................. 705/14, 27, 14.1, 14.51; 455/3.01
See application file for complete search history.

(56) References Cited

U.S. PATENT DOCUMENTS 5,572,442 A    11/1996  Schulhof et al. .......... 364/514 C (Continued)

FOREIGN PATENT DOCUMENTS

EP    881587    2/1998
EP    1041502   4/2000

(Continued)

OTHER PUBLICATIONS

Conover, "Anatomy of IEEE 802.11b Wireless", Network Computing, Aug. 7, 2000, on line at networkcomputing.com/1115/1115ws2.html.*

(Continued)

*Primary Examiner* — John G Weiss
*Assistant Examiner* — Scott C Anderson
(74) *Attorney, Agent, or Firm* — Guntin & Gust, PLC; Ed Guntin

(57) ABSTRACT

Data content providers transfer data content (including DRM protected content) over a broadband network onto one or more information filling stations (IFSs) situated at one or more physical locations. Users are able to wirelessly communicate with the IFSs via one or more of portable devices that are operable in close proximity to the IFS. Data content requested by the portable devices include, but are not limited to: multimedia files, WWW data, real-time and interactive games, e-mail (with or without attachments), electronic newspapers, news and sports information, traffic and weather information, e-books, interactive messaging, and/or data files. Additionally, the portable devices are also capable of facilitating point-of-sale purchases and electronic funds transfers. Optionally, the IFS also forwards advertisements promoting products and services to the portable devices. The portable device is also able to instruct the IFS to selectively send each content of interest or product of interest to one or more identified locations (e.g., users can send large multimedia to their home PCs).

19 Claims, 11 Drawing Sheets

(56) References Cited

U.S. PATENT DOCUMENTS

| | | | |
|---|---|---|---|
| 5,982,891 A * | 11/1999 | Ginter et al. | 705/54 |
| 6,129,274 A | 10/2000 | Suzuki | |
| 6,163,711 A * | 12/2000 | Juntunen et al. | 455/557 |
| 6,317,718 B1 | 11/2001 | Fano | |
| 6,435,406 B1 | 8/2002 | Pentel | |
| 6,484,148 B1 | 11/2002 | Boyd | |
| 6,513,015 B2 | 1/2003 | Ogasawara | |
| 6,526,335 B1 * | 2/2003 | Treyz et al. | 701/1 |
| 6,571,279 B1 | 5/2003 | Herz et al. | |
| 2001/0013120 A1 | 8/2001 | Tsukamoto | 725/5 |
| 2001/0037360 A1 | 11/2001 | Ekkel | 709/203 |
| 2001/0039662 A1 | 11/2001 | Sibley | 725/136 |
| 2001/0044747 A1 | 11/2001 | Ramachandran et al. | 705/16 |
| 2002/0016740 A1 | 2/2002 | Ogasawara | |
| 2002/0052781 A1 | 5/2002 | Aufricht et al. | 705/14 |
| 2002/0062251 A1 | 5/2002 | Anandan et al. | |
| 2002/0073057 A1 | 6/2002 | Benoit et al. | 707/1 |
| 2002/0077901 A1 | 6/2002 | Katz | |
| 2002/0082925 A1 | 6/2002 | Herwig | |
| 2002/0115449 A1 | 8/2002 | Allen | |
| 2002/0174025 A1 | 11/2002 | Hind et al. | |
| 2003/0037261 A1 * | 2/2003 | Meffert et al. | 713/201 |

FOREIGN PATENT DOCUMENTS

| | | |
|---|---|---|
| WO | 98/38589 | 9/1998 |
| WO | WO 00/65514 | 11/2000 |
| WO | 01/89189 | 11/2001 |
| WO | WO 01/95267 | 12/2001 |

OTHER PUBLICATIONS

"MPEG-4 Applications", MPEG '98, (International Conference of the Motion Picture Experts Group) International Standards Organization, Tokyo, Mar. 1998.*

Fox, "TCP Big Window and Nak Options", Network Working Group, Request for Comments No. 1106, Jun. 1989, archive maintained by the Internet Engineering Task Force, on line at tools.ietf.org/html/rfc1106.*

* cited by examiner

INFORMATION FILLING STATION FACILITATING WIRELESS TRANSFER OF DATA CONTENT TO A PORTABLE DEVICE OR OTHER PRE-DEFINED LOCATIONS

BACKGROUND OF THE INVENTION

1. Field of Invention

The present invention relates generally to the field of digital content providers. More specifically, the present invention is related to wireless transfer of data content to a portable device or other pre-defined locations.

2. Discussion of Prior Art

Data content providers presently push a myriad of data content (such as e-mail, data files, multimedia files, etc.) to various portable devices (such as personal computers, laptops, personal digital assistant (PDA), etc.). Some of the limitations associated with prior art systems in the transfer of such data content include limitations in the size of the data content to be transferred and limitations associated with the transmission rate as defined by the networks over which the data content is to be transferred.

FIG. 1 illustrates a simple prior art scenario 100 wherein one or more data content providers 102, 104, 106 push data content over a network 108 onto a proxy server 110 which, in turn, interacts with a portable device over a narrow bandwidth network 112. Data content providers include various services such as accessing: e-mail, data files, multimedia files, and other miscellaneous information services. Users access such data content via various portable devices, including: wireless phones 114, PDA 116, pagers 118, etc. The narrow bandwidth networks 112 over which the end device and the proxy server interact include broadcast networks, cellular networks, and satellite-based networks. Although some networks such as some satellite-based networks are promoted as wide bandwidth networks, it should be noted that only a portion of the bandwidth associated with such networks is allocated for the purposes of personalized data content transmission, thereby limiting the size of data content that can be transferred in a given time period.

It should be noted that, for simplification purposes, only one network cloud is shown facilitating the interaction between the various content providers and the proxy server (network 108) and between the proxy server and the portable device (network 112), but such interactions can occur over one or more networks.

As mentioned earlier, a customer's access to such data content today is limited by the information content (size) and network speed (rate) by which the information can be delivered to the device. Certain services are typically only one-way, i.e., radio broadcast and satellite services. On the other hand, e-mail and data file delivery, while two-way, is limited to very narrow bandwidths, which restrict the type and quantity of information that can be delivered to the customer's portable device.

Thus, the prior art systems fail to provide for a fast and efficient way to facilitate the interaction between the content providers and the portable devices. Additionally, the prior art fails to disclose a system wherein content providers push data content over a broadband network to information filling stations at various physical locations accessible by portable devices (associated with mobile users) that wirelessly transact, access, and receive data content from the information filling station.

One popular method of implementing a wireless connection is based upon the IEEE 802.11 standard. 802.11 refers to a family of specifications developed by the Institute of Electrical and Electronics Engineers (IEEE) for wireless local area network (LAN) technology. 802.11 specifies an over-the-air interface between a wireless client and a base station or between two wireless clients. There are several specifications in the 802.11 family, some of which are described below:

- 802.11—applies to wireless LANs providing 1 or 2 Mbps transmission in the 2.4 GHz band using either frequency hopping spread spectrum (FHSS) or direct sequence spread spectrum (DSSS).
- 802.11a—an extension to 802.11 that applies to wireless local area networks (LANs) and provides up to 54 Mbps in the 5 GHz band. 802.11a uses an orthogonal frequency division multiplexing encoding scheme rather than FHSS or DSSS.
- 802.11b—also referred to as 802.11 High rate or Wi-Fi (for wireless fidelity), formed as a ratification to the original 802.11 standard, allowing wireless functionality comparable to the Ethernet. This is an extension to 802.11 that applies to wireless LANs and provides 11 Mbps transmission (with fallback to 5.5, 2, and 1 Mbps) in the 2.4 GHz band. Transmission in the 802.11b standard is accomplished via DSSS.
- 802.11g—applies to wireless LANs and provides 20+ Mbps in the 2.4 GHz band.

The most popular of the above standards is the 802.11b. One problem associated with this standard is that the signal strength fades away as a function of distance and, as a result, the data rate falls back to 5.5, 2, or 1 Mbps, depending on the distance from the Wi-Fi router/hub and the strength of the signal.

The following references provide a general description of digital content providers that allow digital content to be downloaded.

The U.S. patent to Schulhof et al. (U.S. Pat. No. 5,572,442), assigned to Information Highway Media Corporation, provides a system for distributing subscription and on-demand audio programming. Disclosed is a system for downloading digital audio data onto a portable audio storage medium and listening to it at a desired time. The portable audio storage medium is capable of high-speed data transfer that can be downloaded from such systems as a television cable system, satellite, or fiber optic telephone link.

The published U.S. patent application to Tsukamoto (2001/0013120A1), assigned to NEC Corporation, provides for a digital content rental system. Disclosed is a process that consists of a customer visiting the store with a portable storage unit, such as a magnetic disk. The user may then choose from a plurality of digital content and download desired content onto his/her storage medium.

The published U.S. patent application to Ekkel (2001/0037360A1), assigned to Koninklijke Philips Electronics N.V., provides for a data service at a transit terminal. Disclosed is a system that provides information content to a user at a repository. While a consumer is traveling, a data service offers information availability that can be downloaded by the user to a storage device to be viewed offline. Using a mobile storage medium, such as a memory card or a magnetic disk, the individual may use the highly customizable service to download electronic information content from a host repository or server.

The published U.S. patent application to Sibley (2001/0039662A1), assigned to Hughes Electronics Corporation, provides for a digital over-the-air communication system for use with a digital terrestrial broadcasting system. Disclosed is a system for distributing electrical content using digital over-the-air communication. The process consists of a network operation center uplinking electronic content packages to a satellite, a broadcast center receiving the electronic content from the satellite, and a user device receiving the digital content via a digital channel generated by the broadcast center.

The published U.S. patent application to Ramachandran et al. (2001/0044747A1), assigned to Diebold, Incorporated, provides a system and method for dispensing digital information from an automated transaction machine. Disclosed is a service that offers digital content information to a user through an automated transaction machine.

Whatever the precise merits, features, and advantages of the above-cited references, none of them achieve or fulfill the benefits of the present invention.

SUMMARY OF THE INVENTION

The present invention provides for one or more information filling stations (IFS) located at one or more physical locations accessible by mobile users who wirelessly communicate with the IFS via a portable device that is in close proximity to the IFS. Users are able to wirelessly communicate with the IFS and request diverse data content such as: multimedia files, WWW data, real-time and interactive games, e-mail (with or without attachments), electronic newspapers, news and sports information, traffic and weather information, e-books, interactive messaging, and/or data files. Additionally, the portable devices are also capable of facilitating point-of-sale purchases and electronic funds transfers. Furthermore, users are able to use their portable device (which is either a stand-alone device or a device integrated with an automobile) to selectively transfer data content onto various locations such as, but not limited to, a portable device, a PC located at home, a PC located at work, etc. The IFS performs such data content transfers only after authenticating users (via a smart card or a virtual private network setup) via their portable device.

Upon such authentication, the IFS receives one or more content requests and identifies any content in such requests that is protected (e.g., copyrighted materials) using, for example, Digital Rights Management (DRM) models. Next, the availability and pricing information of the requested content (including any fees payable to content providers with respect to DRM-protected content) is extracted from one or more databases and transmitted onto the portable device, wherein it is rendered.

Optionally, one or more advertisements are also transmitted via the IFS for promoting one or more products, wherein the advertisements either provide for or indicate a location for accessing pricing information related to the advertised products. Subsequently, instructions identifying content of interest, any products of interest, and routing instructions (identifying locations for selectively transferring each of the content of interest and any of the products of interest) are received by the IFS. Upon reception of these instructions, the IFS identifies pricing associated with the products of interest and performs a financial transaction based upon any pricing information associated with the content of interest and the products of interest. Lastly, a payment arrangement is made with the content providers for any identified fees that are payable with respect to the protected content, and the IFS selectively sends to the identified locations corresponding content of interest and any products of interest.

In the preferred embodiment, the mobile device is either carried in or integrated with an automobile, and the wireless communication between the mobile device and the IFS is based upon the IEEE 802.11b protocol.

DESCRIPTION OF THE PREFERRED EMBODIMENTS

Figure 1:
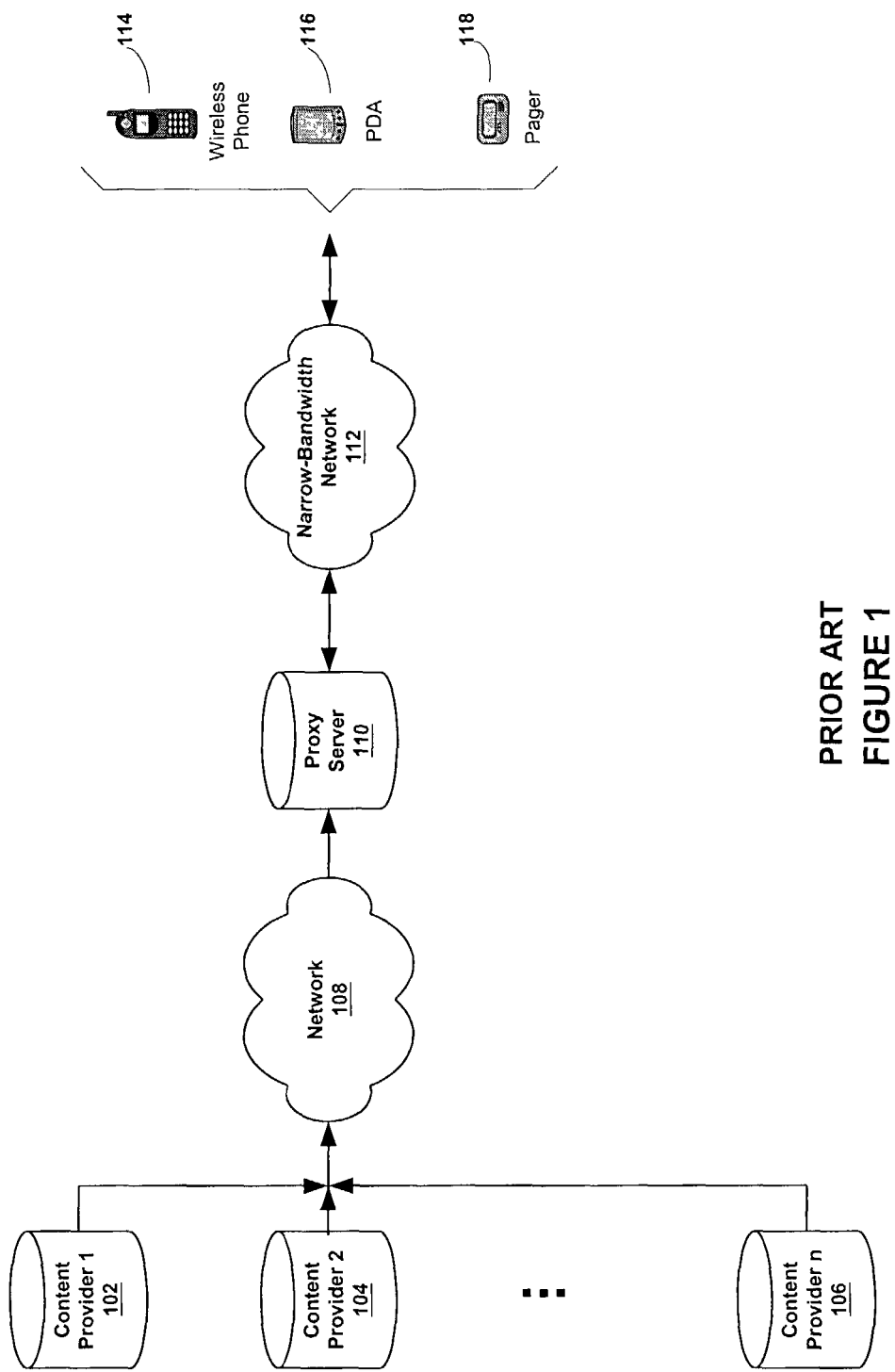
FIG. 1 illustrates a simple prior art scenario wherein one or more data content providers push data content onto one or more portable devices via a proxy server.

While this invention is illustrated and described in a preferred embodiment, the invention may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Throughout the specification, the preferred embodiment of the present invention is described with a specific example of a portable device in an automobile, but it should be noted modifications, such as the integration of the portable device and the vehicle are envisioned, and such modifications should not be used to limit the scope of the present invention.

Figure 2:
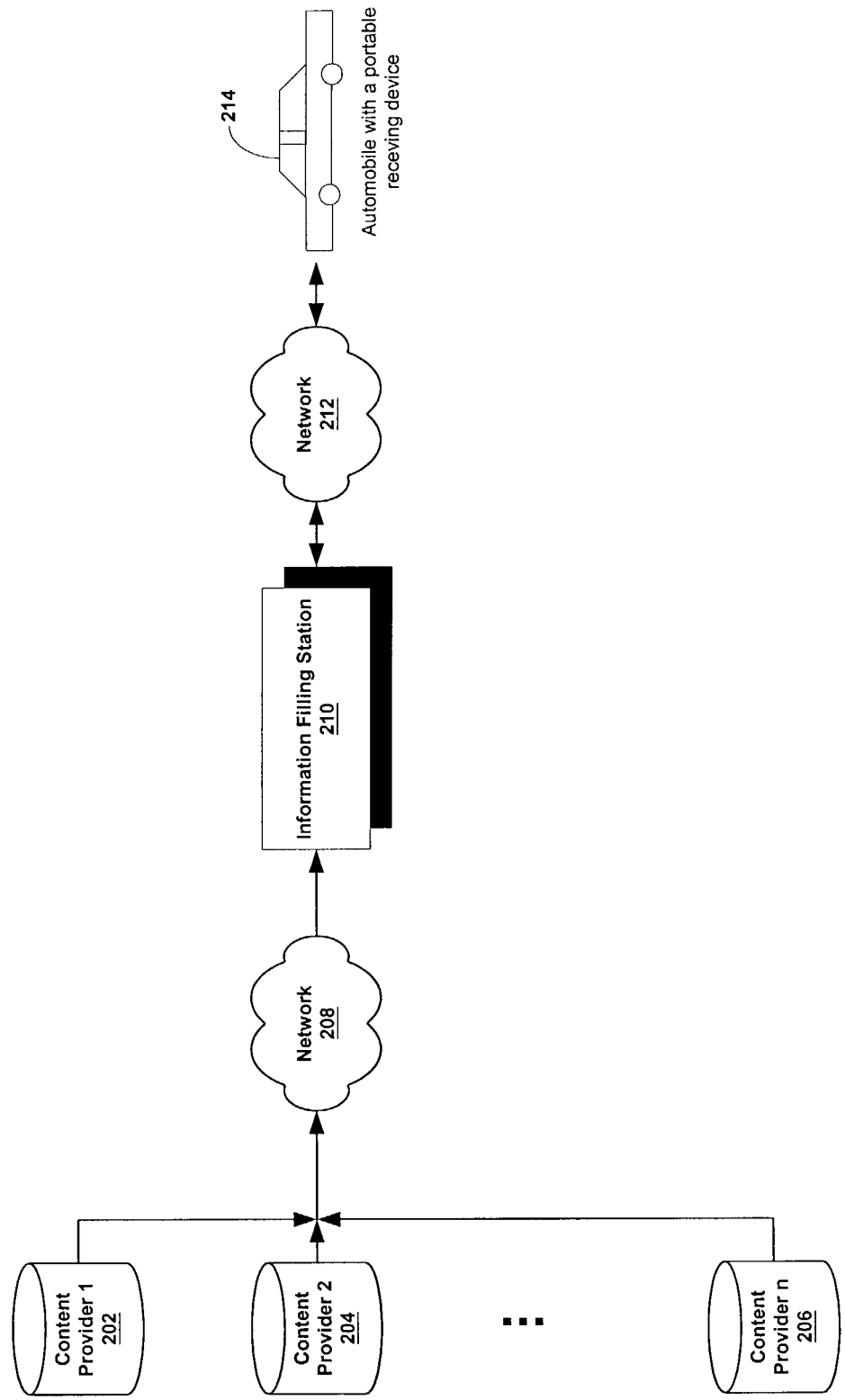
FIG. 2 illustrates a general architecture associated with the preferred embodiment of the present invention.

FIG. 2 illustrates a general architecture 200 associated with the preferred embodiment of the present invention. In this example, a user in an automobile 214 equipped with a mobile device (stand-alone or integrated) is able to drive up to one of many information filling stations (IFSs) 210 that are physically located at various accessible locations. Once in close proximity to an IFS 210, users can authenticate themselves (via a security identity module (SIM) card or a virtual private network setup) to perform various functions via their portable device.

For example, users can wirelessly send one or more requests for data content to the IFS 210 which, upon reception of such requests, identifies if any of the requested data content is protected via Digital Rights Management (DRM). The IFS 210 interacts with one or more data content providers 202, 204, 206 to extract the requested data content. Next, the availability and pricing information of the requested content (including any additional fees identified with content protected via DRM) is extracted from the content providers 202, 204, 206 and transmitted onto the portable device in automobile 214, wherein it is rendered.

One or more broadband networks 210 facilitate the transfer of data between the data content providers 202, 204, 206 and IFS 216. The broadband networks used in conjunction with the present invention include local area networks (LAN), wide area networks (WAN), or the Internet. In one embodiment, data is transferred between the content providers and the IFS via a digital synchronous line (DSL) link. The data content that can be transferred includes, but is not limited to, multimedia files, WWW data, real-time and interactive games, e-mail (with or without attachments), electronic newspapers, news and sports information, traffic and weather information, e-books, interactive messaging, and data files. Thus, the system of the present invention provides access to an entire spectrum of diverse data content and uniquely solves the information content size and network speed (data rate) limitation inherent in prior art cellular, terrestrial, and satellite-based systems.

By using the IFS model of the present invention, customers are offered improved access to broadband networks without limitations in the size or data rate of information content to be transferred. Furthermore, the present invention provides convenient data access, as the IFS ports may be located at any public or privately accessible location including, but not limited to: gas stations, shopping malls, schools, airports, convenience stores, truck stops, hospitals, libraries, pay telephone locations, or any other location in close proximity of the vehicle. The IFS provides wireless high-speed access to vehicles or handheld devices wherein, in the preferred embodiment, the wireless access is based upon the 802.11b protocol. It should, however, be noted that one skilled in the art can envision using other wireless protocols including the IEEE 802.11a or IEEE 802.11g protocols. Thus, such limitations in the protocols used should not be used to limit the scope of the present invention.

Figure 3:
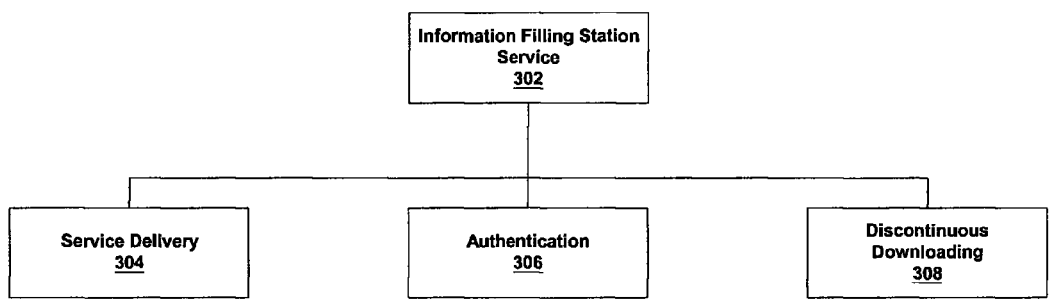
FIG. 3 illustrates various categories of service that the IFS of the present invention is capable of delivering.

FIG. 3 illustrates various categories of service that the IFS of the present invention is capable of delivering. The various IFS services can be categorized as: 1) service delivery, 2) authentication, and 3) discontinuous downloading.

1. Service Delivery

Figure 4:
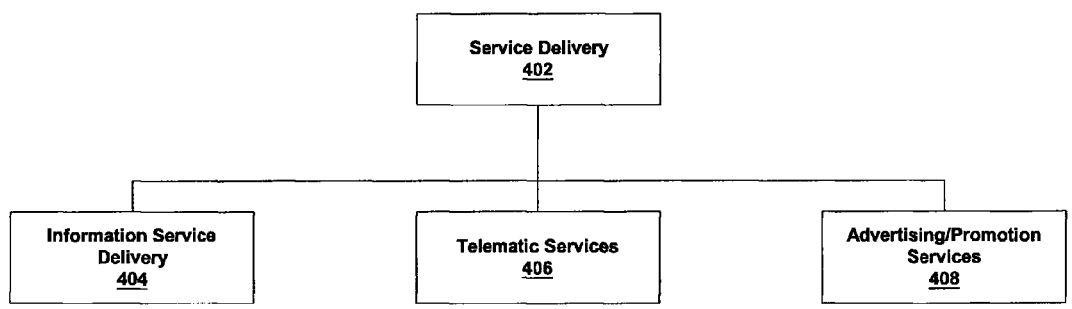
FIG. 4 illustrates various categories of service offered under the service delivery category.

FIG. 4 illustrates the various categories of service offered under the service delivery category. This includes: information service delivery 404, telematic services 406, and advertising and promotional services 408.

a. Information Services Delivery.

Figure 5:
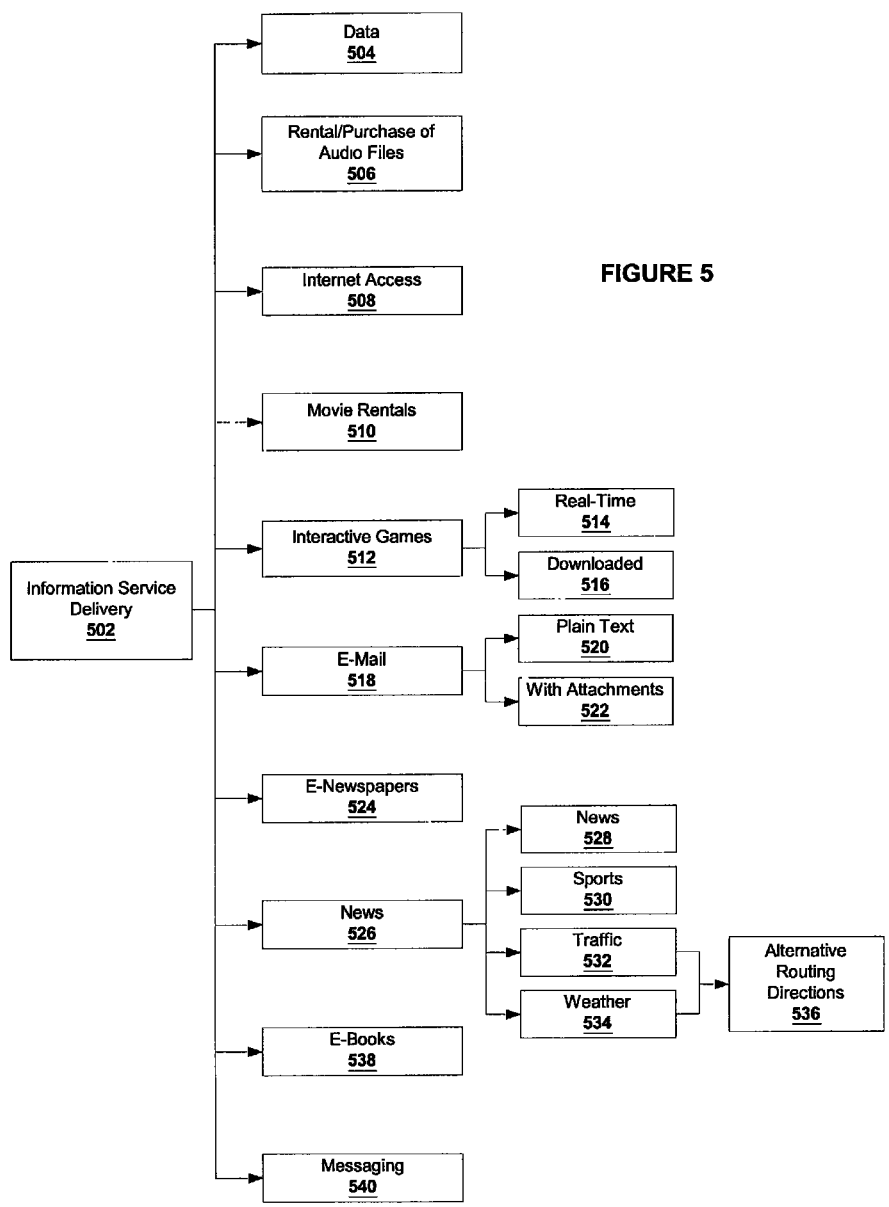
FIG. 5 illustrates various information services that are deliverable by the IFS of the present invention.
Figure 6:
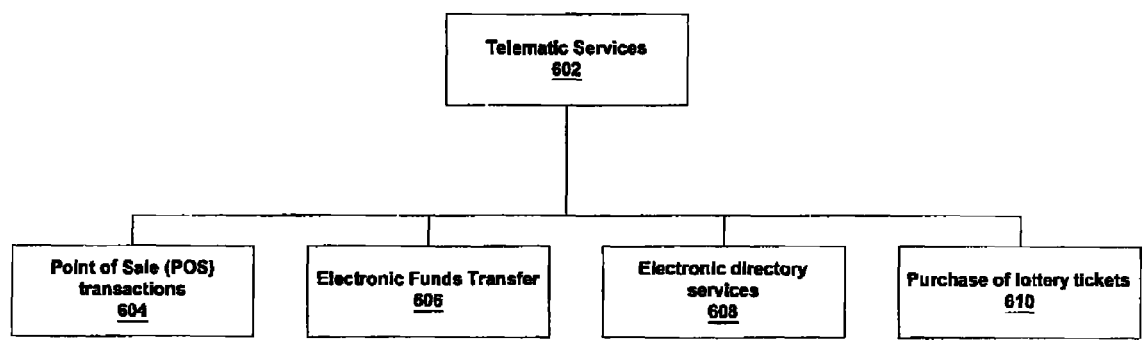
FIG. 6 illustrates various telematic services associated with the present invention.
Figure 7:
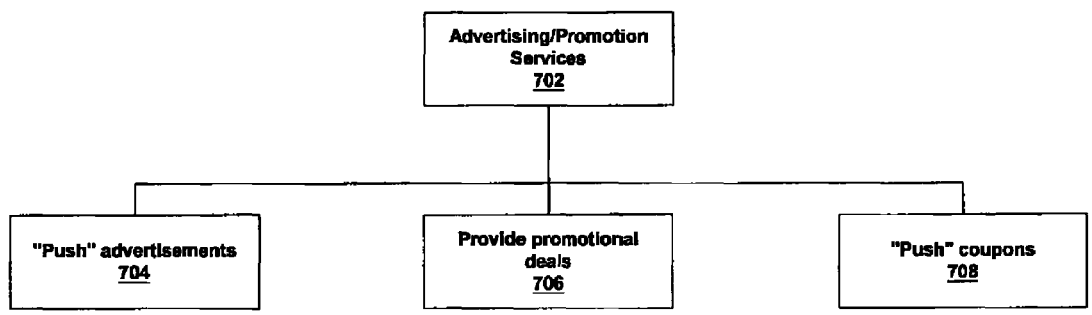
FIG. 7 illustrates the various advertising and promotional services associated with the present invention.

FIG. 5 illustrates various information services 502 that are deliverable by the IFS. Information services delivered between the IFS and a portable device (handheld or integrated within an automobile) include, but are not limited to:
  data files of various formats 504;
  rental or purchase multimedia files (e.g., audio files, video files, etc.) 506. Thus, for example, appropriate Digital Rights Management (DRM) copyrighted MP3 audio files can be accessed and delivered to authorized customers, thereby providing a distribution channel for record companies;
  World Wide Web (WWW) access 508 allowing a user to access the Internet via the IFS;
  rental or purchase of a full-length movie at movie rental outlets 510 wherein an IFS is located outside a movie rental place and a transaction can be performed via a portable device to digitally rent a movie. The digital content associated with the movie can be either wirelessly transferred onto a portable device or be routed to a device at a remote location, such as home or office. Thus, the IFS concept allows users to drive up to an IFS and download digital movies via a wireless port (or such digital content can be optionally routed to other locations). In the preferred embodiment, the format of the digital content related to movies is MPEG4 and appropriate DRM processing is performed before transferring such content;
  interactive games 512 (real-time interactive games 514 or downloadable games 516);
  access to e-mail 518 (plain text e-mail 520 or e-mail with attachments 522);
  access to electronic newspapers for download 524;
  access to information 526 such as, but not limited to: news headlines 528, sports news 530, traffic news 532, and weather information 534;
  in one embodiment, the traffic 532 and weather 534 information also include alternative routing directions 536;
  electronic book delivery 538; and/or
  interactive messaging 540.

b. Telematic Services:

FIG. 6 illustrates the various telematic services associated with the present invention. Telematic services 602 that are delivered between the IFS and a portable device (stand-alone or integrated with an automobile) include, but are not limited to:
  point-of-sale (POS) transactions (such as purchasing gasoline and/or food at convenience stores) 604;
  purchase of lottery tickets 606;
  electronic funds transfers 608 (wherein users access financial institutions via their portable devices to provide instructions regarding electronic transfer of funds); or
  electronic directory services 610 (wherein users are able to use their portable devices to search or query electronic directories).

c. Advertising and Promotion Services:

FIG. 7 illustrates the various advertising and promotional services associated with the present invention. Advertisement and promotional services delivered between the IFS and a vehicle mounted or handheld device include, but are not limited to:
  "Push" advertising for restaurants, lodging, gasoline purchasing, and entertainment within close proximity of an IFS 704;
  promotional deals from businesses in close proximity to an IFS, i.e., a free car wash or food with gasoline fill-up 706; and/or
  "Push" coupons for product promotions 708.

2. Authentication

Figure 8:
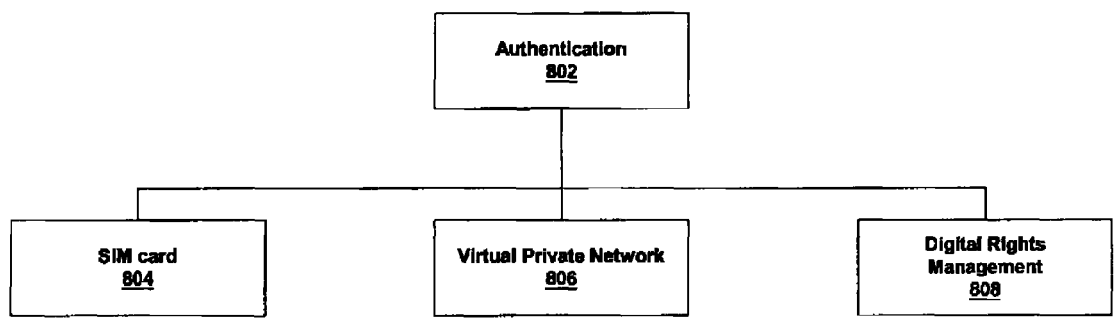
FIG. 8 illustrates various modes of authentication of the portable device.

FIG. 8 illustrates various modes of authentication associated with the present invention. The IFS supports individual vehicle or device authentication through:
  SIM card capabilities 804;
  a virtual private network (VPN) 806; or
  Digital Rights Management based (DRM-based) authentication to ensure content security and reduce pirating of copyrighted material 808.

Figure 9:
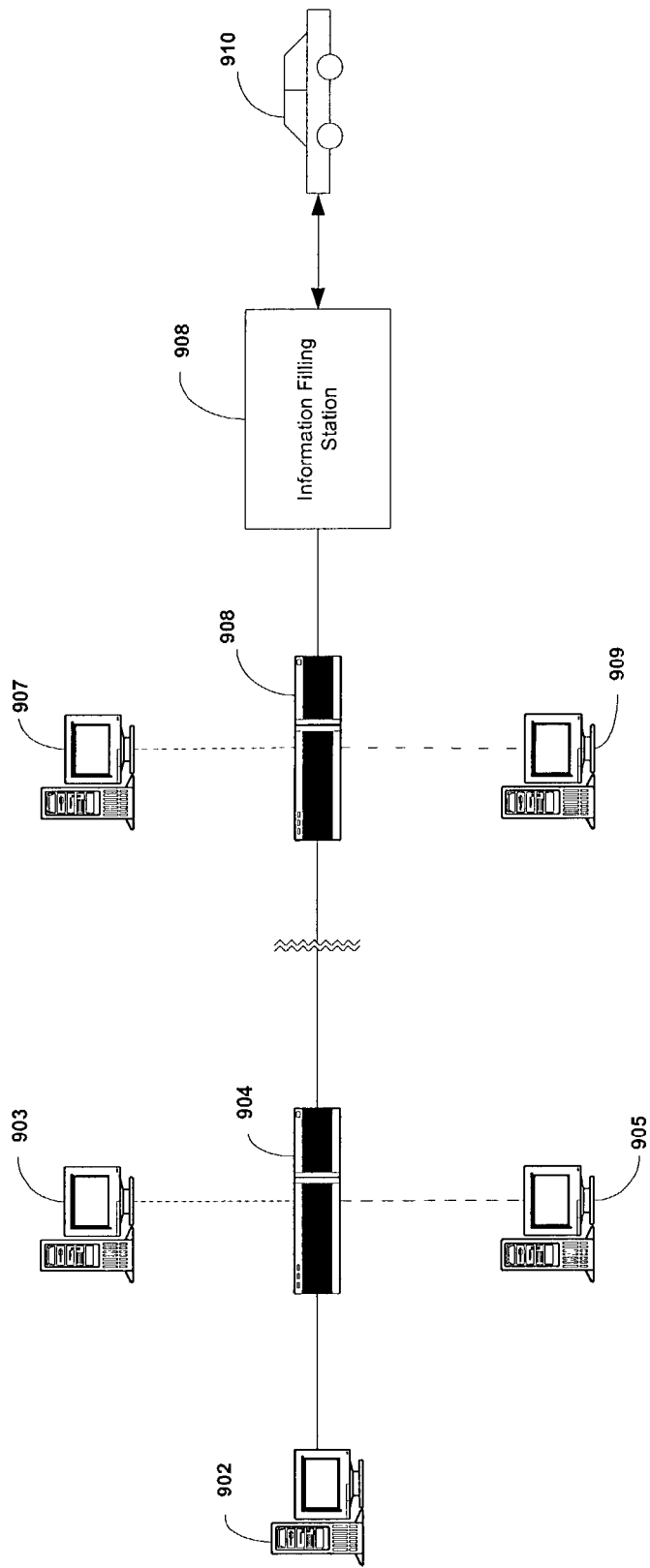
FIG. 9 illustrates vehicle or device authentication via a virtual private network (VPN).

FIG. 9 illustrates a simple vehicle or device authentication based on a VPN setting. VPN is a network that is constructed by using public wires to connect nodes. For example, there are a number of systems that enable one to create networks using the Internet as the medium for transporting data. These systems use encryption and other security mechanisms to ensure that only authorized users can access the network and that data cannot be intercepted.

In this setting, an authenticating server 902 and an IFS 908 are part of a VPN represented by the solid line in FIG. 9. It should be noted that other computers (such as 903, 905, 907, and 909) can also be connected to the service provider backbone routers 904 and 906, but they do not form a part of the virtual private network. Thus, an IFS wirelessly interacting with an automobile or mobile device is able perform authentication over such a VPN.

3. Discontinuous Downloading

The IFS supports discontinuous downloading, which provides a cohesive download of large files (movies, music, or files) without having to remain at an IFS port for long periods of time. The IFS supports redirected downloads by allowing users to selectively route information services or content to other locations such as home or office.

Figure 10A:
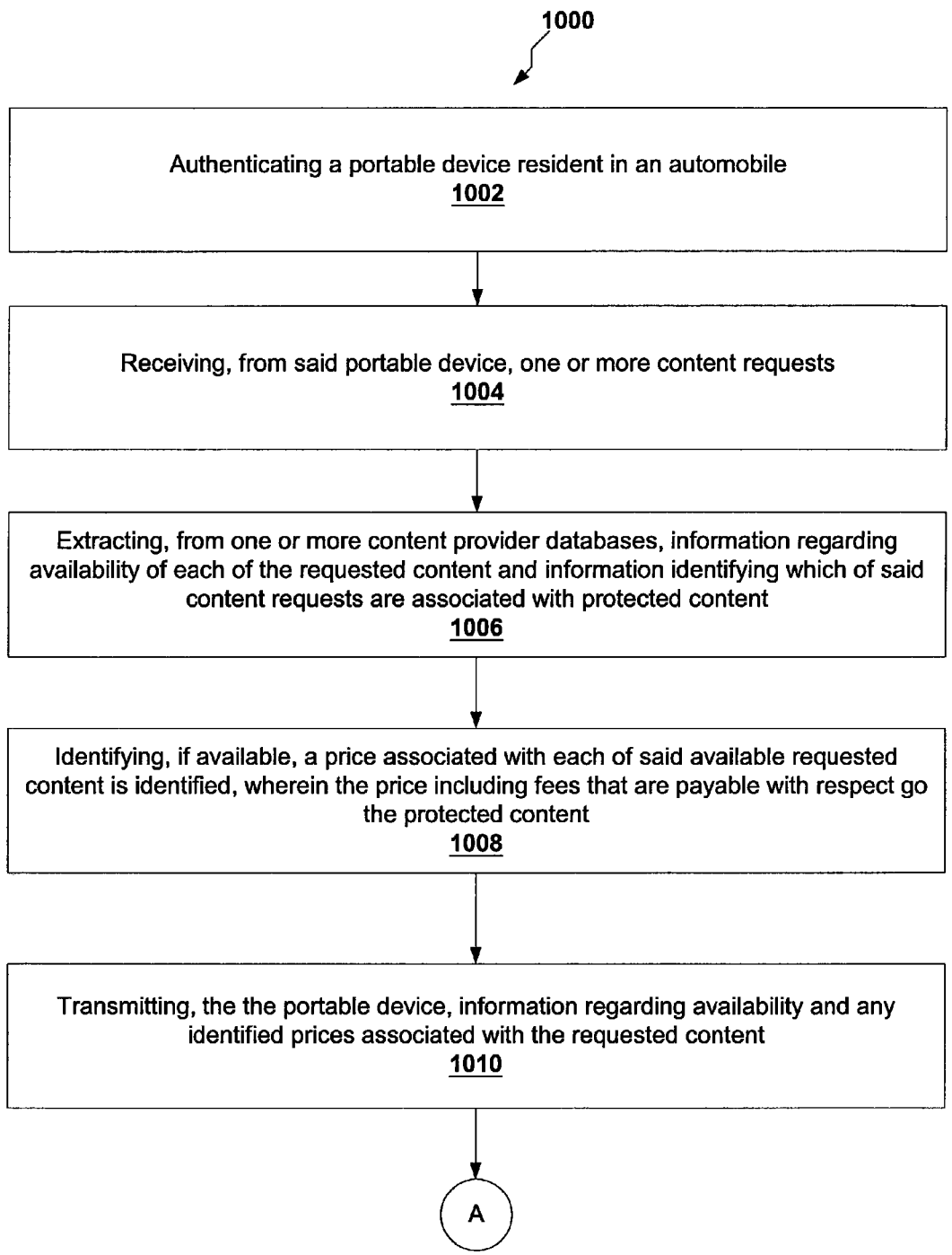
FIGS. 10a-10b collectively illustrate the present invention's method for selectively routing data content based upon a wireless interaction between a portable device and an information filling station (IFS).
Figure 10B:
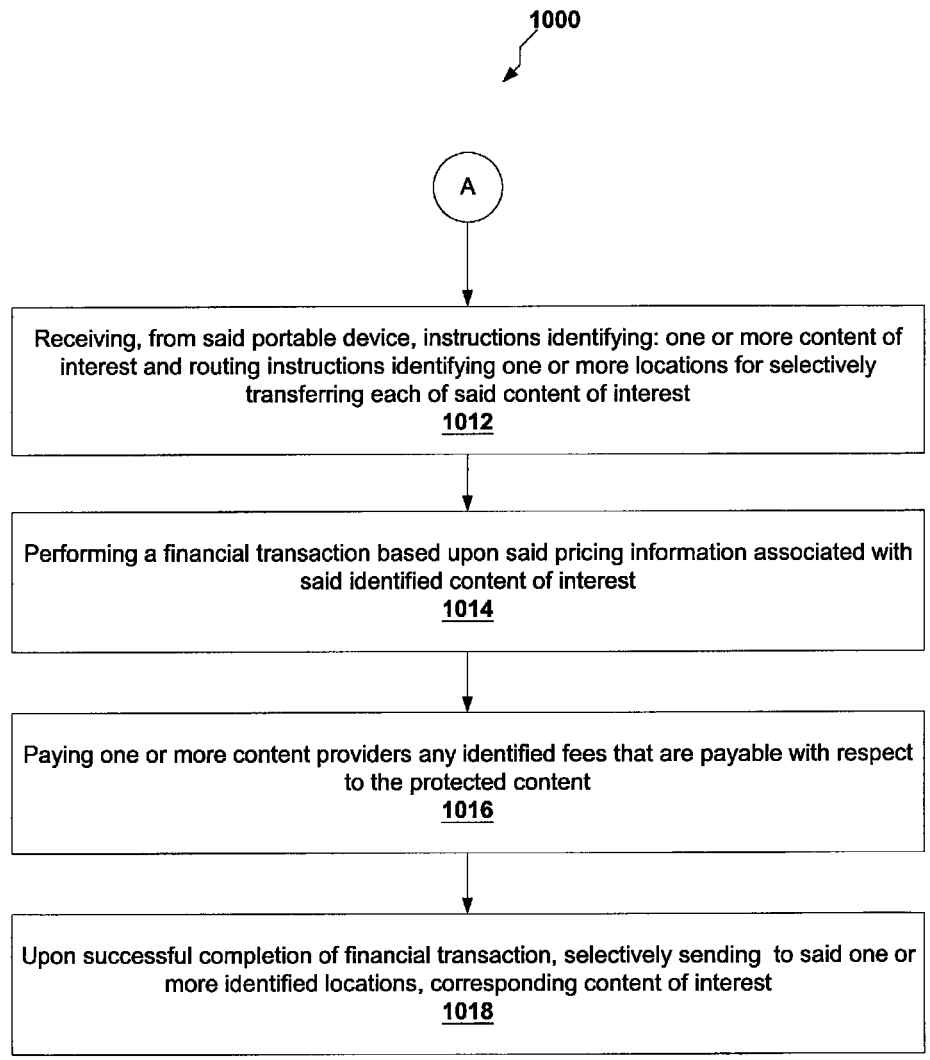

FIGS. 10a-10b collectively illustrate the present invention's method 1000 for selectively routing data content based upon wireless interaction between a portable device and an information filling station (IFS). In step 1002, a portable device (either a stand alone device or a device integrated with an automobile) is authenticated, and in step 1004, one or more content requests are received by the IFS. Next, in step 1006, information is extracted from one or more content provider databases regarding availability of each of said requested content and information identifying which of said content requests are associated with protected content. Additionally, in step 1008, a price (if available—as some items may be available free of charge) associated with each of the available requested content is identified, wherein the price includes any fees that are payable with respect to said protected content. Furthermore, in step 1010 information regarding availability and any identified prices associated with the requested content is transmitted from the IFS to the portable device.

In step 1012, instructions are received from the portable device identifying one or more content of interest and routing instructions identifying one or more locations for selectively transferring each of the content of interest. Next, in step 1014, a financial transaction is performed based upon any pricing information associated with said content of interest, and upon successful completion of the financial transaction: a) one or more content providers are paid the identified fees that are payable with respect to said protected content 1016; and b) corresponding content of interest is selectively sent to the one or more identified locations 1018.

Optionally, one or more advertisements promoting one or more products, are wirelessly transmitted from the IFS to the portable device wherein it is rendered. These advertisements either providing for, or indicating, a location for accessing pricing information related to the products. Furthermore, in this scenario, additional instructions are received from the portable device identifying any products of interest and one or more locations for selectively routing each of said products of interest. Next, pricing (if available) associated with said products of interest are identified and a financial transaction is performed based upon any pricing information associated with said products of interest. Upon successful completion of the financial transaction, the IFS aids in selectively sending the identified products of interest to their corresponding identified locations.

It should be noted that the content requests as described in the above method is for any of, or a combination of, the following content: data files, rental of multimedia content, purchase of multimedia content, WWW data content, rental of digital movie content, purchase of digital movie content, real-time games, interactive games, e-mail with attachments, electronic newspapers, news information, sports information, traffic information, electronic books, or interactive messaging. Additionally, the wireless interaction in the preferred embodiment is based upon the IEEE 802.11b wireless protocol and the preferred format for transfer of digital movie content is the MPEG4 format.

Furthermore, the method described in FIGS. 10a-10b is not restricted to just requests for information service content, but can include requests for telematic services. In this scenario, the IFS receives one more requests for telematic services from said portable device and the IFS then identifies, if available, a price associated with the requested telematic services. Next, a financial transaction is performed based upon any identified price associated with the requested telematic services. Lastly, upon successful completion of the financial transaction, the IFS either performs or schedules the requested telematic services. Examples of telematic services that can be requested include any of, or a combination of the following requests: requests for point of sale transactions, request to purchase lottery tickets, requests for electronic transfer of funds, or request for electronic directory services. An example of a specific implementation of the present invention to purchase digital content is now provided.

Example

In this example, a consumer with a portable computer-based device walks into a store and wirelessly connects to the store's local area network (LAN). Next, the consumer browses the products in the store and identifies a product of interest, such as an audio CD (or a DVD). Next, the consumer scans the barcode associated with the audio CD (or a DVD) using the portable computer-based device. Then, the consumer is given the option of sampling the content (either in part or its entirety) of the audio CD (or the DVD) for a limited number of times (e.g., the tracks can be listened to twice in its entirety or a clip of the movie can be watched twice). Based on the sampled content, consumers are able to decide if they are interested in purchasing a copy of the CD or DVD (either in a digital form or on a tangible medium such as a CD or DVD sent to a physical location). Additionally, users are also given the option of downloading such content with an expiration date. For example, a CD or DVD can be purchased as a 3-day rental or a 3-day day on demand download. In the event the consumer is interested in the digital form of the product of interest, a process for downloading the digital content is started.

It should be noted that the consumer does not have to be at the store after a decision is made to download (to the portable computer-based device or another physical location such as home or office). In the event the content is to be downloaded to the portable computer-based device and if consumers are no longer connected to the store's LAN, they may be required to connect to another network to continue the download process for an additional charge, or alternatively, they can pull up at one of the many information filling stations to complete the download.

Although specific examples of products of interest (e.g., CD's and DVD's) are provided, one skilled in the art can envision purchasing other products, and hence should not use the type of product to limit the scope of the present invention.

Thus, the present invention allows customers who are mobile to access broadband network services without ties to broadband wired connections in homes or offices.

Furthermore, the present invention includes a computer program code based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage device.

Implemented in computer program code based products are software modules for: authenticating said portable device; aiding in the reception of one or more content requests from said portable device; aiding in extracting, from one or more databases, information regarding availability of each of said requested content and information identifying which of said content requests are associated with protected content; identifying, if available, a price associated with each of said available requested content including any fees that are payable with respect to said protected content; aiding in transmitting, to said portable device: said information regarding availability and any identified prices associated with said requested content; aiding in receiving, from said portable device, instructions identifying one or more content of interest and routing instructions identifying one or more locations for selectively transferring each of said content of interest; aiding in performing a financial transaction based upon any pricing information associated with said content of interest and upon successful completion of said financial transaction, aiding in paying to one or more content providers, said identified fees that are payable with respect to said protected content; and aiding in selectively sending to said one or more identified locations, corresponding content of interest.

CONCLUSION

A system and method has been shown in the above embodiments for the effective implementation of an information filling station facilitating wireless transfer of data content to a portable device or other pre-defined locations. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by type or portable device, type of data content, type of protection, number of content provider databases, type of wireless network, type of network between content provider database and IFS, software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of conventional computer storage, display (i.e., CRT), and/or hardcopy (i.e., printed) formats. The programming of the present invention may be implemented by one skilled in the art of wireless transmission protocol programming (e.g., 802.11b communication protocol programming) and database management.

The invention claimed is:

1. A method, comprising:
    receiving, by a first information filling station of a plurality of information filling stations, media content,
        wherein the plurality of information filling stations are physically located at a plurality of geographically dispersed locations,
        wherein each of the plurality of information filling stations stores the media content purchasable by a plurality of portable devices,
        wherein each of the plurality of information filling stations provides the plurality of portable devices wireless access to the media content by way of a short-range wireless interface having a first communications bandwidth and a first communication range,
        wherein the first bandwidth exceeds a second communications bandwidth of a communication network providing long-range wireless services to the plurality of portable devices, and
        wherein the first communication range is substantially lower than a second communication range of the communication network;
    detecting, by the first information filling station, a portable device of the plurality of portable devices in a communication range of the information filling station;
    verifying, by the first information filling station, that the portable device is authorized to request data content responsive to detecting the portable device, wherein the data content is protected according to digital rights management rules;
    receiving, by the first information filling station, from the portable device a request for content;
    extracting, by the first information filling station, from a database, information regarding availability of the content requested and information identifying that the content requested is protected by the digital rights management rules;
    identifying, by the first information filling station, a price associated with the content requested;
    transmitting, by the first information filling station, to the portable device the information regarding the availability and the price associated with the content requested;
    receiving, by the first information filling station, from the portable device first instructions to transmit content of interest identified by the portable device according to the information transmitted to the portable device;
    performing, by the first information filling station, a financial transaction between the portable device and the first information filling station based upon the price associated with the content of interest, and;
    upon successful completion of the financial transaction, initiating, by the first information filling station, transmission of the content of interest to portable device; and
    detecting, by the first information filling station, that the portable device is no longer in the communication range of the first information filling station before completing transmission of the content of interest, thereby resulting in a portion of undelivered content,
        wherein the portable device receives transmission of the portion of the undelivered content from a second information filling station having the portion of the undelivered content, and
        wherein the first information filling station and the second information filling station are in disparate geographic locations, each having copies of the content requested by the portable device.

2. The method of claim 1, wherein the step of performing a financial transaction further comprises the step of receiving payment information from the portable device that is directed to a content providers for delivery of the content of interest.

3. The method of claim 1, wherein short-range wireless interface is based upon an 802.11 wireless protocol.

4. The method of claim 1, wherein the content request comprises one of data files, rental of multimedia content, purchase of multimedia content, internet data content, rental of digital movie content, purchase of digital movie content, real-time games, interactive games, e-mail with attachments, electronic newspapers, news information, sports information, traffic information, electronic books, interactive messaging, or any combination thereof.

5. The method of claim 4, wherein the digital movie content is in a format defined by a moving pictures experts group.

6. The method of claim 1, wherein the method further comprises:
   receiving a second request for telematic services from the portable device;
   identifying, if available, a second price associated with the requested telematic services;
   performing a second financial transaction based upon any identified price associated with the requested telematic services; and
   performing or scheduling the requested telematic services.

7. The method of claim 6, wherein the requested telematic services comprises one of a request for a point of sale transaction, a purchase of a lottery ticket, an electronic transfer of funds, electronic directory services, or any combination thereof.

8. The method of claim 1, wherein the portable device is integrated in an automobile.

9. The method of claim 1, wherein the database interacts with the first information filling station over a network, wherein the network is one of a local area network, a wide area network, the Internet, or any combination thereof.

10. A non-transitory article of manufacture comprising a computer usable medium having computer readable program code embodied therein, which when executed by a processor of a first information filling station of a plurality of information filling stations, causes the processor to perform operations comprising:
   verifying, by the first information filling station, that a portable device of a plurality of portable devices is authorized to request data content, wherein the data content is protected according to digital rights management rules,
      wherein the plurality of information filling stations are physically located at a plurality of geographically dispersed locations,
      wherein each of the plurality of information filling stations stores media content purchasable by the plurality of portable devices,
      wherein each of the plurality of information filling stations provides the plurality of portable devices wireless access to the media content by way of a short-range wireless interface having a first communications bandwidth and a first communication range,
      wherein the first bandwidth exceeds a second communications bandwidth of a communication network providing long-range wireless services to the plurality of portable devices, and
      wherein the first communication range is substantially lower than a second communication range of the communication network;
   receiving a content request from the portable device;
   obtaining, by the first information filling station, from a database, information regarding availability of the content requested and information identifying that the content requested is protected by the digital rights management rules;
   identifying, by the first information filling station, a price associated with the content requested;
   transmitting, by the first information filling station, to the portable device the information regarding the availability and price associated with the content requested;
   performing, by the first information filling station, a financial transaction with the portable device based on the price associated with the content requested; and
   upon successful completion of the financial transaction, initiating transmission of content requested to the portable device.

11. The non-transitory article of manufacture of claim 10, wherein the medium further comprises paying a content provider for a distribution of the content requested by the portable device.

12. The non-transitory article of manufacture of claim 10, wherein the operations further comprise:
   receiving an additional request for telematic services from the portable device;
   identifying, if available, a second price associated with the requested telematic services;
   performing a second financial transaction based upon any identified price associated with the requested telematic services; and
   performing or scheduling the requested telematic services.

13. A method, comprising:
   routing, by a portable device comprising a processor, data content to a location based upon a wireless interaction between the portable device and a first information filling station of a plurality of information filling stations,
      wherein the plurality of information filling stations are physically located at a plurality of geographically dispersed locations,
      wherein each of the plurality of information filling stations stores the data content,
      wherein the portable device is one of a plurality of portable devices of a communication network,
      wherein each of the plurality of information filling stations provides the plurality of portable devices wireless access to media content by way of a short-range wireless interface having a first communications bandwidth and a first communication range,
      wherein the first bandwidth exceeds a second communications bandwidth of a communication network providing long-range wireless services to the plurality of portable devices, and
      wherein the first communication range is substantially lower than a second communication range of the communication network;
   providing, by the portable device, authentication information to the first information filling station;
   receiving, by the portable device, an indication from the first information filling station upon successful authentication that the portable device is authorized to request data content;
   transmitting, by the portable device, to the first information filling station, a content request;
   receiving, by the portable device, from the first information filling station information regarding availability of the content requested, and a price associated with the content requested;
   transmitting, by the portable device, to the first information filling station, instructions identifying a content of interest;

performing, by the portable device, a financial transaction between the portable device and the first information filling station based upon the price associated with the content of interest; and upon successful completion of the financial transaction, receiving, by the portable device, from the first information station, a confirmation indicating a transfer of the content of interest.

14. The method of claim 13, further comprising receiving authorization for use of the content requested upon submitting payment to a content provider according to the price.

15. The method of claim 13, wherein the short-range wireless interface is based upon an 802.11 wireless protocol.

16. The method of claim 13, wherein the content requested comprises one of a data file, a rental of multimedia content, purchase of multimedia content, internet data content, a rental of digital movie content, a purchase of digital movie content, a game, e-mail, an electronic newspaper, news information, sports information, traffic information, electronic books, interactive messaging, or any combination thereof.

17. The method of claim 13, wherein the method further comprises:

transmitting a request for telematic services to the first information station;

receiving, if available, pricing information associated with the requested telematic services;

performing a second financial transaction based upon any identified price associated with the requested telematic services; and upon successful completion of the second financial transaction, receiving confirmation indicating completion or scheduling of the requested telematics services.

18. The method of claim 17, wherein the requested telematic services comprises one of a request for a point of sale transaction, a purchase of a lottery ticket, an electronic transfer of funds, an electronic directory services, or any combination thereof.

19. The method of claim 13, wherein processing and delivery of the content is based upon digital rights management rules.

* * * * *